United States Patent
Nakash et al.

(10) Patent No.: US 10,205,891 B2
(45) Date of Patent: Feb. 12, 2019

(54) METHOD AND SYSTEM FOR DETECTING OCCUPANCY IN A SPACE

(71) Applicant: POINTGRAB LTD., Hod Hasharon (IL)

(72) Inventors: Moshe Nakash, Kiryat Ono (IL); Mark Ginzburg, Beer Sheva (IL); Jonathan Laserson, Tel-Aviv (IL); Ora Zackay, Hod Hasharon (IL); Gilboa Levy, Tel-Aviv (IL); Eyal Frishman, Hod Hasharon (IL)

(73) Assignee: POINTGRAB LTD., Hod Hasharon (IL)

( * ) Notice: Subject to any disclaimer, the term of this patent is extended or adjusted under 35 U.S.C. 154(b) by 170 days.

(21) Appl. No.: 15/368,884

(22) Filed: Dec. 5, 2016

(65) Prior Publication Data

US 2017/0163909 A1 Jun. 8, 2017

Related U.S. Application Data

(60) Provisional application No. 62/262,389, filed on Dec. 3, 2015.

(51) Int. Cl.
| | |
|---|---|
| *H04N 7/18* | (2006.01) |
| *H04N 5/33* | (2006.01) |
| *G06T 7/70* | (2017.01) |
| *G06K 9/00* | (2006.01) |
| *G06T 7/60* | (2017.01) |
| *H04N 5/232* | (2006.01) |
| *G06T 7/20* | (2017.01) |
| *G06T 7/215* | (2017.01) |

(52) U.S. Cl.
CPC ......... *H04N 5/332* (2013.01); *G06K 9/00771* (2013.01); *G06T 7/20* (2013.01); *G06T 7/215* (2017.01); *G06T 7/60* (2013.01); *G06T 7/70* (2017.01); *H04N 5/23241* (2013.01); *G06T 2207/20076* (2013.01); *G06T 2207/20081* (2013.01); *G06T 2207/30196* (2013.01); *G06T 2207/30232* (2013.01); *G06T 2207/30242* (2013.01)

(58) Field of Classification Search
CPC .................................. G06T 7/70; H04N 5/332
USPC ......................................................... 348/164
See application file for complete search history.

(56) References Cited

U.S. PATENT DOCUMENTS

| | | | | |
|---|---|---|---|---|
| 6,396,534 B1 * | 5/2002 | Mahler | ............ | G08B 13/19602 348/155 |
| 6,486,778 B2 * | 11/2002 | Mahler | ............ | G08B 13/19697 250/214 AL |
| 8,184,154 B2 * | 5/2012 | Estevez | ............ | G06K 9/00369 342/28 |

OTHER PUBLICATIONS

P. Senti, "Distributed People Counting Using a Wireless Sensor Network" Aug. 2011, Swiss Federal Institute of Technology, Zurich, Switzerland, http://e-collection.library.ethz.ch/eserv/eth:7290/eth-7290-01.pdf.

* cited by examiner

*Primary Examiner* — Richard T Torrente
(74) *Attorney, Agent, or Firm* — Alphapatent Associates, Ltd; Daniel J. Swirsky (57) ABSTRACT

A method and system for determining occupancy in a space, include determining presence of an occupant in a space based a signal from a PIR sensor monitoring the space and on analysis of an image of the space. Assigning different weights to the PIR signal and image analysis enables controlling a device in the space differently.

10 Claims, 8 Drawing Sheets

METHOD AND SYSTEM FOR DETECTING OCCUPANCY IN A SPACE

CROSS-REFERENCE TO RELATED APPLICATIONS

This application claims priority from U.S. Provisional Patent Application No. 62/262,389, filed Dec. 3, 2015, and Israel Patent Application No. 242928, filed Dec. 3, 2015, the contents of which are incorporated herein by reference in their entirety.

FIELD

The invention relates to the field of occupancy detection. Specifically, the invention relates to detecting occupancy in a space using a motion detector and an image sensor.

BACKGROUND

The ability to detect and monitor occupancy in a space, such as a room or building, enables planning and controlling building systems for better space utilization, to minimize energy use, for security systems and more.

The use of sensors to detect and monitor occupancy in spaces has been explored. For example, motion detectors, such as ultrasound or passive infra-red (PIR) sensors, are commonly used to determine occupancy in a controlled space. However, these occupancy detecting systems are typically not effective in monitoring occupants in a space as they do not easily detect multiple occupants or sedentary occupants. Neither can these systems provide accurate information on locations of an occupant in a space.

Some systems for spatial monitoring or surveillance utilize a low resolution motion sensor together with a higher resolution image sensor, using each sensor according to ambient conditions in a space. These systems also do not enable easy detection of sedentary occupants and therefore do not provide a full solution to occupancy determination.

Improved methods and systems for occupancy determination will provide better building efficiency, operational convenience, and wide-spread implementation of occupancy based control systems in living and work spaces.

SUMMARY

Embodiments of the invention provide a method and system for detecting and monitoring occupants in a space even while an occupant is sedentary. Embodiments of the invention provide relatively computationally inexpensive methods for detecting occupants, tracking occupants, determining the number of occupants and monitoring occupants in a space.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Embodiments of the invention provide a method and system for determining occupancy in a space. "Determining occupancy" or "detecting occupancy" may include detecting presence of an occupant and/or monitoring one or more occupants throughout the space e.g., counting occupants, tracking occupants, determining occupants' location in a space, etc.

Embodiments of the invention enable detecting and monitoring occupancy in a space even while an occupant is sedentary.

"Occupant" may refer to any type of occupant such as a human and/or animal occupant.

In one embodiment a method for detecting occupancy in a space includes identifying an object as an occupant using different signals from sensors monitoring the space. In one embodiment the method includes detecting motion in the space based on a signal from a motion detector, e.g., a PIR sensor. Upon detection of motion in the space, a moving object is detected in an image of the space. The moving object may be determined to be an occupant based on image analysis of the image (or images) of the space. For example, a shape of the object may be detected using shape detection algorithms and/or machine learning processes. The shape of the object may be used to determine if the object is an occupant.

In another example, parameters of the motion of the object may be analyzed from images of the space and these parameters (e.g., size of motion, direction of movement, speed of motion, etc.) may be used to determine if the object is an occupant.

In some embodiments different information from images (e.g., shape information and motion information) may be used in combination to determine if an object is an occupant.

In one embodiment a method for detecting occupancy in a space includes identifying an object as an occupant using different signals from sensors monitoring the space, dependent on the size of motion created by the object. A size of motion may mean the amount of change created by the movement of the object in images of the space and may be measured, for example, by calculating a percent of changed pixels between typically consecutive images or by other image analyses.

According to one embodiment the method includes detecting an object in the space based on a PIR signal from a PIR sensor monitoring the space and based on data from an image sensor imaging the space, if a motion size of the object is above a threshold and identifying the object as an occupant based on image data from the image sensor and not based on a PIR signal from the PIR sensor, if the motion size of the object is below the threshold.

Based on the identification of the object as an occupant an "occupancy signal" may be generated and this signal may be used for controlling devices in the space, for determining the number of occupants in the space, for monitoring occupants and more. An occupancy signal may include information which can translate to presence (or no presence) of an occupant in the space, to a number of occupants in the space, to locations of occupants in the space etc.

According to one embodiment the method includes detecting an object in an image of the space and tracking the object. The tracked object is then identified as an occupant. The detection of the object may be based on motion data (e.g., data from a motion detector and/or data from an image sensor) and the identification of the object as an occupant is typically based on image data. Identifying an object as an occupant based on image data in a space such as a room can be difficult and may require considerable computing power however, since the object has been tracked throughout images of the space there is prior information about the object, which assists in determining that the object is an occupant thereby reducing the required computing power.

Methods according to embodiments of the invention may be implemented in a system for detecting occupancy in a space. The system, which may include a motion detector and an image sensor, includes a processor to accept signals and data from the motion detector and from the image sensor to detect an object, to identify the object as an occupant and to monitor the occupant within the space.

A motion detector may include, for example, a passive infrared (PIR) sensor (which, for example, is typically sensitive to a person's body temperature through emitted black body radiation at mid-infrared wavelengths, in contrast to background objects at room temperature), a microwave sensor (which, for example, may detect motion through the principle of Doppler radar), an ultrasonic sensor (which, for example, emits an ultrasonic wave and reflections from nearby objects are received) or a tomographic motion detection system (which, for example, can sense disturbances to radio waves as they pass from node to node of a mesh network). Other known motion detectors may be used according to embodiments of the invention.

Typically, a PIR sensor is suitable for detecting human or animal occupants. A PIR sensor will be used in examples that demonstrate embodiments of the invention however, other motion sensors may be used according to embodiments of the invention. Inanimate occupants, such as vehicles, may also be detected and monitored according to embodiments of the invention.

Figure 1:
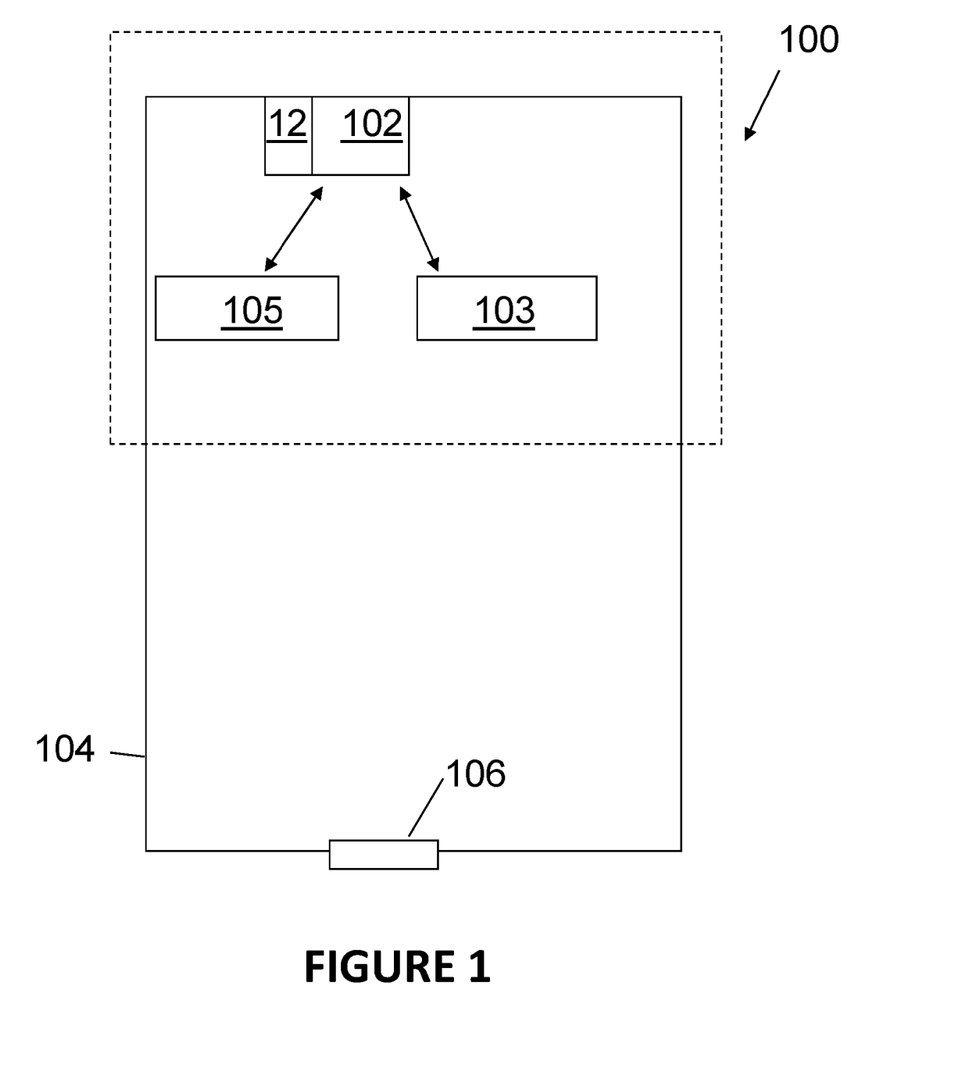
FIG. 1 is a schematic illustration of a system according to embodiments of the invention.

An example of a system operable according to embodiments of the invention is schematically illustrated in FIG. 1.

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well known features may be omitted or simplified in order not to obscure the invention.

Unless specifically stated otherwise, as apparent from the following discussions, it is appreciated that throughout the specification discussions utilizing terms such as "processing," "computing," "calculating," "determining," "detecting", "identifying" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In one embodiment the system 100 may include a motion detector such as PIR sensor 105 that can monitor a space such as a room 104 or portion of a room and an image sensor 103 that can obtain images of the space. The PIR sensor 105 and image sensor 103 may each have their own processor and memory and may communicate between them and/or be in communication with another processor. For example, both PIR sensor 105 and image sensor 103 may be associated with a processor 102 and a memory 12. Processor 102 runs algorithms and processes to detect an occupant and determine occupancy in the space based on signals from the PIR sensor 105 and/or image sensor 103 and the processor 102 may then generate an occupancy signal based on the determination of occupancy. The occupancy signal may be used for controlling devices in the space (e.g., environment comfort devices such as illumination sources, heating, ventilation and air conditioning (HVAC) etc.), for counting occupants in the space, for monitoring occupants and more.

The processor 102 may be in wired or wireless communication with devices and other processors. For example, an occupancy signal generated by processor 102 may activate a process within the processor 102 or may be transmitted to another processor or device to activate a process at the other processor or device.

A counter may be run by a processor to count occupants according to embodiments of the invention. The counter may be part of processor 102 or may be part of another processor that accepts a signal from processor 102.

Processor 102 may include, for example, one or more processors and may be a central processing unit (CPU), a digital signal processor (DSP), a microprocessor, a controller, a chip, a microchip, an integrated circuit (IC), or any other suitable multi-purpose or specific processor or controller.

Memory unit(s) 12 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Images obtained by the image sensor 103 are analyzed by a processor, e.g., processor 102. For example, image/video signal processing algorithms and/or shape detection algorithms and/or machine learning processes may be run by processor 102 or by another processor.

According to some embodiments images and/or signals from a motion detector may be stored in memory 12. Processor 102 can apply image analysis algorithms, such as known motion detection and shape detection algorithms and/or machine learning processes in combination with methods according to embodiments of the invention to identify an imaged object as an occupant and to track the identified occupant.

In one embodiment an object is detected in a space, such as in room 104. The object may be detected by the processor 102 by detecting motion in the space based on a signal from the PIR sensor 105 and based on motion information from images of the space obtained by image sensor 103. In one embodiment the processor 102 creates an object at the location of the detected motion in the images and tracks the object to a second location in a subsequent image or images of the space. The processor 102 may then determine if the object is an occupant based on the subsequent image and possibly other images. For example, the processor 102 may apply shape detection and/or color detection algorithms on the image data from the subsequent image and possibly from other images to identify the tracked object as an occupant. For example shape detection/recognition algorithms may include an algorithm which calculates features in a Viola-Jones object detection framework. In another example, the processor 102 may run a machine learning process using the subsequent image(s) to identify the tracked object as an occupant. For example, a machine learning process may run a set of algorithms that use multiple processing layers on an image to identify desired image features (image features may include any information obtainable from an image, e.g., the existence of objects or parts of objects, their location, their type and more). Each processing layer receives input from the layer below and produces output that is given to the layer above, until the highest layer produces the desired image features. Based on identification of the desired image features an object may be identified as an occupant.

In one embodiment if a motion size in the space is above a threshold, the processor 102 detects an occupant in the space based on a signal from the PIR sensor 105 and based on an image signal from images provided by the image sensor 103. The detected occupant may then be tracked throughout images of the space. However, if the motion size in the space is below the threshold the processor 102 can detect an occupant based on an image signal and does not use the PIR signal for detection of the occupant.

In one embodiment processor 102 detects an object in an image of the space provided by image sensor 103 based on a signal from a motion sensor such as PIR 105 and based on image(s) of the space. The processor 102 receives subsequent images and may use data from the subsequent images to track the object. The subsequent images may be saved in memory 12 and may be used in a machine learning process run by processor 102 to identify the object as an occupant, thereby determining occupancy based on image data of a tracked object. The processor 102 may then generate and output an occupancy signal.

In one embodiment processor 102 generates signals for control of different functions of a device. In one embodiment control of a first function of a device (e.g., ON) is based on analysis of a first image of room 104 and on a first signal from the PIR 105. A second function of the device (e.g., OFF) is based on analysis of a second image of room 104 and on a second signal from the PIR 105.

Analysis of images may include computer vision techniques such as shape detection, motion detection etc., as described above The processor 102 may assign a higher weight to the first PIR signal than to the analysis of the first image and assign a higher weight to the analysis of the second image than to the second PIR signal.

Thus, for example, if a first image of room 104 is an image in which the occupant is only starting to enter the room, typically only part of the occupant will be visible in the image (e.g., the occupant's leg). In this case presence of the occupant in the room 104 is determined based on detection of e.g., motion in the image (and/or based on detection of a shape and/or color or other image analysis) and based on a positive or high signal from the PIR 105, the weight assigned to the PIR signal being higher than the weight assigned to the detected motion (and/or shape/and/or color). An illumination source may be turned ON or the brightness of the illumination source may be raised based on the determined presence of the occupant from the first image. Later, the occupant may leave the room 104. In a second, later, image of room 104, image analysis of the second image (e.g., by processor 102 applying shape detection and/or other algorithms on the second image) shows that there is no occupant detected in the image (e.g., no object having a shape of an object is detected). A determination may be made that there is no occupant present in the room 104, while not giving the PIR signal associated with the second image a high weight in this determination. In this second determination the weight assigned to the image analysis of the second image is higher than the weight assigned to the PIR signal. The illumination source may be turned OFF or the brightness of the illumination source may be lowered based on the determined presence of the occupant from the second image (determination that an occupant is not present).

In some embodiments the location of an object within the image is used as assisting information to facilitate identification of an object an occupant. For example, in one embodiment, if an object is detected at a location in the image that corresponds to the location of the doorway 106 of the room 104 (for example if an object is detected in the perimeter of an image or the object is located in vicinity to the location of the doorway in the image) then, based on a signal from the PIR sensor 105 indicating the presence of an occupant and based on tracking and identifying the object in images of the room 104, a higher probability determination that the object is an occupant may be made compared to the same determination in which the object was not detected at a predefined location (e.g., the perimeter of the image). Thus, images obtained by image sensor 103 may be analyzed by processor 102 for the location of an object. If an object is found at a predetermined location, e.g. at the perimeter of an image or at doorway 106 and based on a signal from the PIR sensor 105 and possibly based on image analysis, the object is determined to be an occupant and an occupancy signal may be generated.

In one embodiment the image sensor 103 is designed to obtain a top view of a space. For example, the image sensor 103 may be located on a ceiling of room 104 to obtain a top view of the room or of part of the room 104. Processor 102 may run processes to enable identification of occupants, such as humans, from a top view, e.g., by using rotation invariant features to identify a shape of a person or by using learning examples for a machine learning process including images of top views of people or other types of occupants.

Figure 2A:
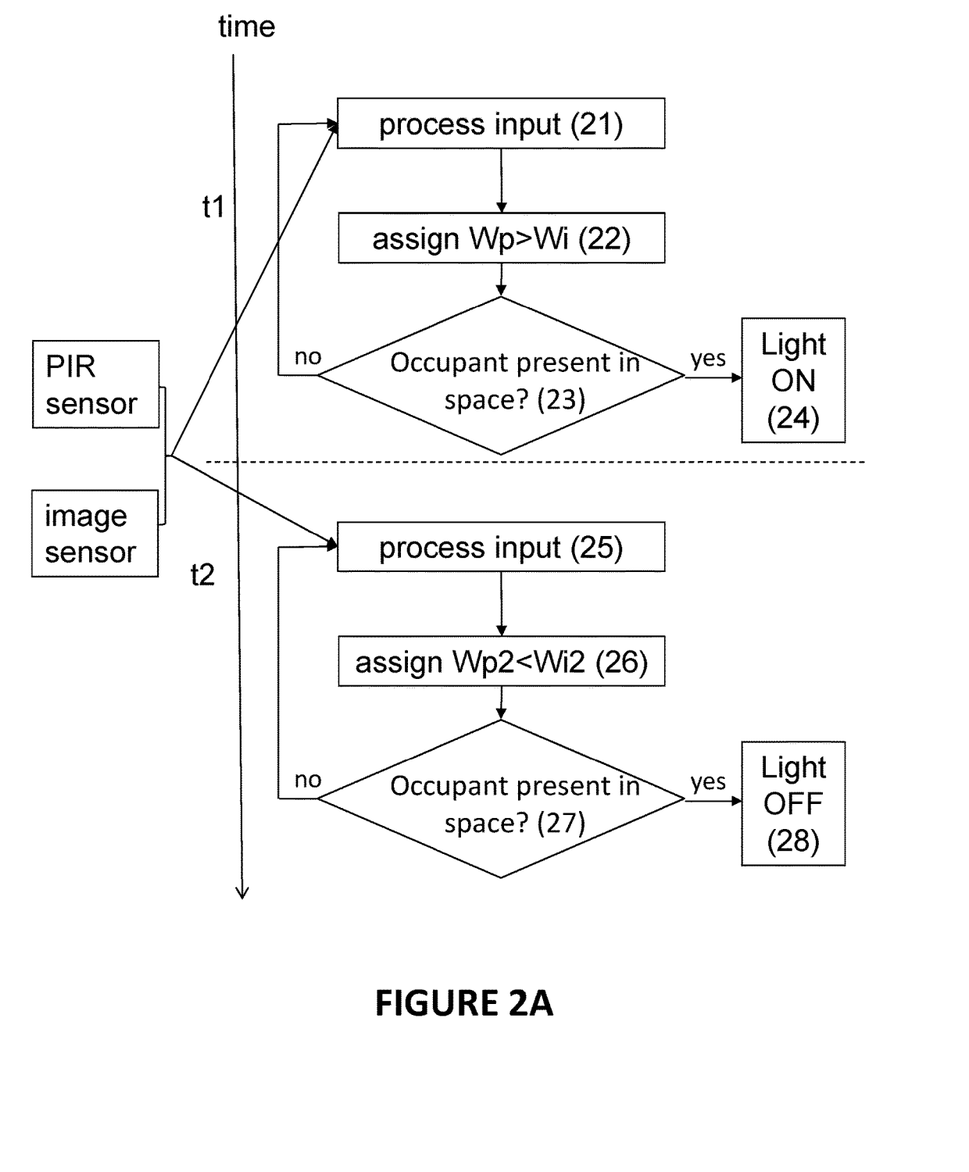
FIGS. 2A and 2B are schematic illustrations of methods for detecting occupancy in a space using weighted PIR and image input and dependent on the motion size of the occupant, according to embodiments of the invention.
Figure 2B:
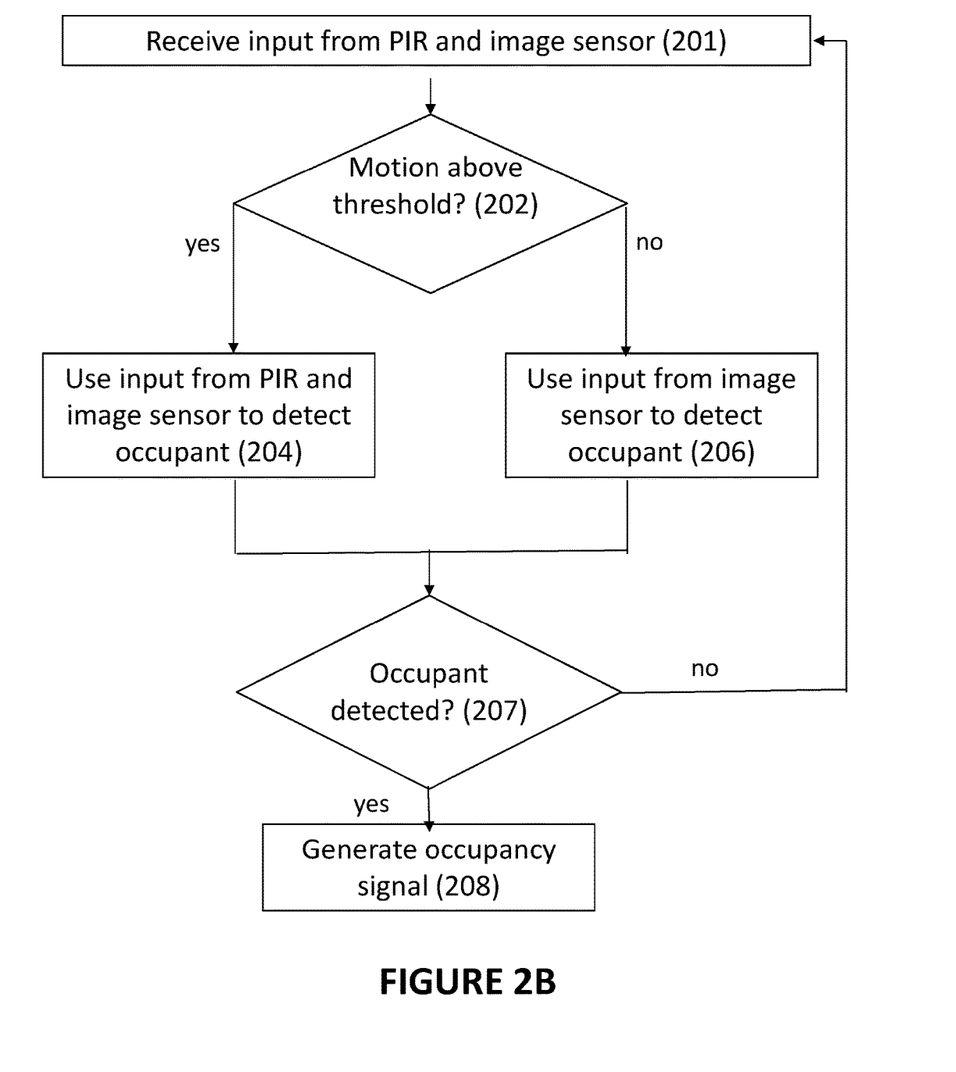

In one embodiment, which is schematically illustrated in FIGS. 2A and 2B, a method for detecting occupancy in a space includes receiving input from a PIR sensor monitoring a space and from an image sensor imaging the space.

In one embodiment the method includes obtaining a first determination of presence of an occupant in a space based on a first signal from a PIR sensor and based on analysis of a first image of the space, the first signal from the PIR sensor receiving a higher weight than the analysis of the first image and obtaining a second determination of presence of an occupant in the space based on a second signal from the PIR sensor and based on analysis of a second image of the space, the second signal from the PIR sensor receiving a lower weight that the analysis of the second image. A device, such as an environment comfort device, may be controlled differently based on the first and second determinations.

In one example which is schematically illustrated in FIG. 2A, a PIR sensor (e.g., 105) and an image sensor (e.g., 103) provide input to a processor (e.g., 102). The inputs may be further processed, e.g., by processor 102. For example, a plurality of outputs from the PIR sensor may be calculated and combined into a single PIR signal and image analysis algorithms may be applied on the input from the image sensor.

In a first instance (t1) the inputs from the PIR sensor and image sensor are processed (21). A weight Wp is assigned to the (typically processed) input from the PIR and a weight Wi is assigned to the (typically processed) input from the image sensor (22). In this first instance, at t1, Wp is larger than Wi. If an occupant is detected in the space based on the weighted inputs from the PIR and image sensor (23) then a first function of a device (e.g., a light source in room 104) is controlled, for example the light source may be turned ON (24). If no occupant is detected (23) then subsequent PIR and image inputs are analyzed.

In a second instance (t2) second inputs from the PIR sensor and image sensor are processed (25). A weight Wp2 is assigned to the (typically processed) input from the PIR and a weight Wi2 is assigned to the (typically processed) input from the image sensor wherein Wi2p is larger than Wp2 (26). If an occupant is detected in the space based on the weighted inputs from the PIR and image sensor (27) then there is no change in the function of the light source and further PIR and image input may be analyzed. If an occupant is not detected (27) then a second function of the device is controlled, for example, the light source is turned OFF (28).

In one embodiment, in the second, later, instance, a larger portion of an occupant may be included in the image such that a shape of an occupant may be detected from the second image. Thus, in one embodiment the image analysis applied on the image in the second instance includes shape detection algorithms, for example, as described herein.

In one embodiment determining presence of an occupant in a space includes calculating a probability of an object in an image of the space being an occupant. For example, if a probability calculated for an object being an occupant in an image is below a predetermined threshold then it may be determined that there is no occupant in that image.

In some embodiments an occupant detected in a first image may be tracked (e.g., as described herein) from the first image to subsequent images, e.g., to the second image.

In some embodiments image analysis includes determining a location of an occupant in the image. In some embodiment a first determination of occupancy may be obtained based on the inputs from the image sensor and PIR sensor and based on a location of the occupant in the first image (e.g., as described above with reference to FIG. 1 and FIG. 5)

In some embodiments taking using different weights for the inputs from the PIR and images sensor includes using only one of the inputs and not the other (e.g., one input is assigned weight zero). One example of this embodiment is schematically illustrated in FIG. 2B. In this example a method for detecting occupancy in a space includes receiving input from a PIR sensor monitoring a space and from an image sensor imaging the space (201). The input from the PIR sensor may include the PIR sensor output or a result of a function calculating a plurality of outputs from the PIR sensor. The input from the image sensor may include images or a signal generated based on analysis of images.

Motion, typically movement of an object, may be detected in the space. If the motion size is above a predetermined threshold (202) then the input from the PIR sensor and the input from the image sensor are used to detect the occupant (204). If the motion size is below the predetermined threshold (202) then input from the image sensor but not from the PIR sensor is used to detect the occupant (206). If an occupant is detected (207) an occupancy signal may be generated (208) and may be output to control other devices (e.g., lighting or heating, ventilation and air conditioning (HVAC) devices) or may be used to track or locate occupants, to determine the number of occupants, etc.

If an occupant is not detected (207) then subsequent PIR and image sensor outputs may be analyzed for presence of an occupant in the space.

A predetermined threshold of motion size may be based on a change in the space. For example, the threshold may be a predetermined number or percent of changed pixels in images of the space.

In one embodiment the predetermined threshold is the motion size or change detectable by the PIR sensor. In this embodiment, if a motion is not detected by the PIR sensor then that motion size is below the predetermined threshold.

In some embodiments when a motion size is above the threshold an occupant may be detected based mainly on motion information derived from images of the space (e.g., percent of changed pixels in between images). When the motion size is below the threshold an object may be detected mainly based on shape or size derived from the images (e.g., based on detecting appearance features such as, color, edge responses, texture and shape cues, etc.).

Thus, according to embodiments of the invention, if an object in a space moves, causing a large change (e.g., the object may be a person's foot while entering a room) then the object is identified as an occupant based on a signal from the PIR and based on an image signal from the image sensor. For example, an object will be identified as an occupant if a change of output voltage of a PIR sensor (or average or mode or other function of a plurality of outputs from the PIR sensor) is indicative of the presence of a human and an image signal is indicative of motion of a person (e.g., a large enough or certain type of motion and/or a large enough size of object and/or direction of movement or other parameters). However, if an object in the space is sedentary or if the object performs small movements that cannot be detected by the PIR sensor or movements that cause only a small change in the space, e.g., only a small number or percent of the pixels of an image are changed because of the movement, the object is identified as an occupant based on information about the object derived from images. For example, if the object is sedentary an image signal based on shape information and/or size and/or color information may be used to identify the object as an occupant.

As discussed above, the PIR signal may be based on a plurality of PIR sensor outputs. A typical PIR sensor detects changes in the amount of infrared radiation from an object in the field of view of the sensor, which varies depending on the temperature and surface characteristics of the object. When a human or animal occupant moves within the field of view of the sensor the temperature at the location of the occupant in the sensor's field of view will rise from room temperature to body temperature, and then back again. The PIR sensor converts the resulting change in the sensed infrared radiation into a change in the output voltage.

Figure 3:
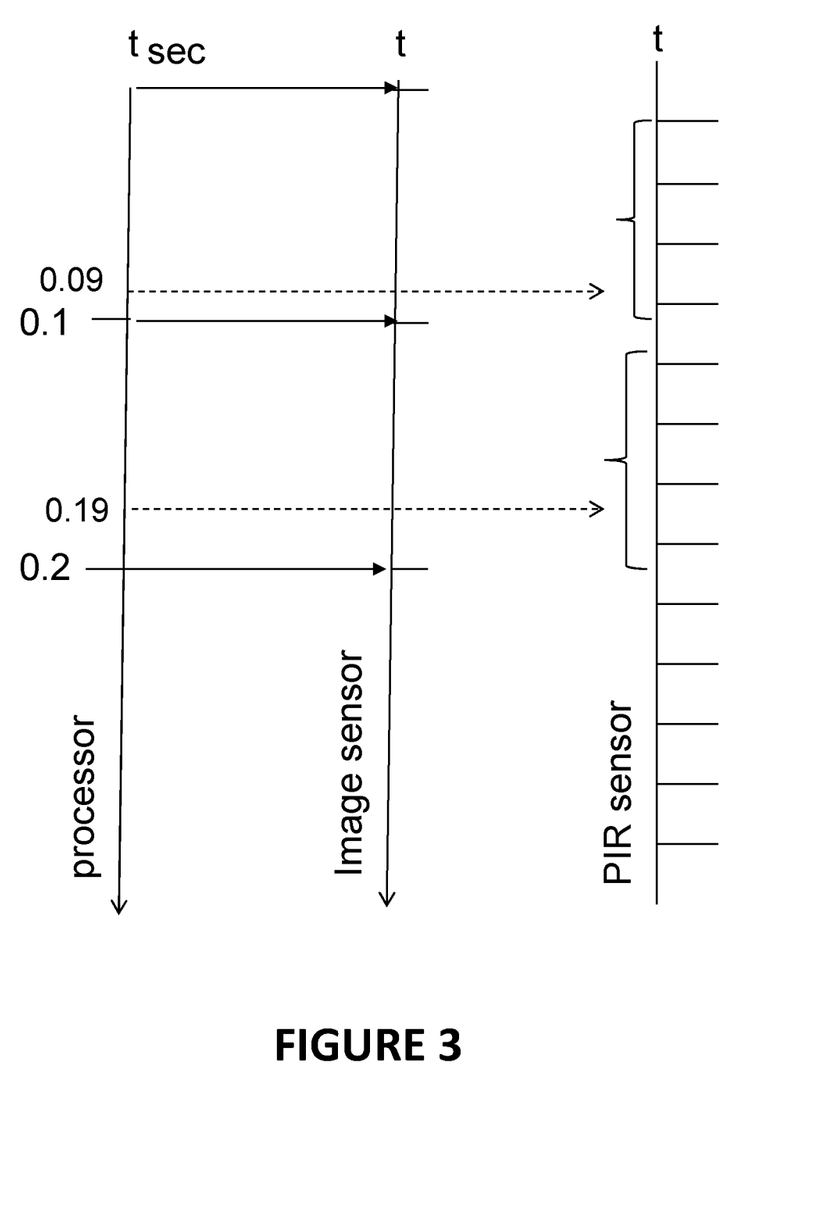
FIG. 3 is a schematic illustration of the PIR and image sampling process, according to one embodiment of the invention.

In one embodiment an example of which is schematically illustrated in FIG. 3, a processor, such as processor 102, samples images from an image sensor monitoring a space, at a preset schedule, and samples a PIR signal at prescheduled time intervals, typically time intervals that correspond to the images schedule. For example, FIG. 3 illustrates time lines of an image sensor imaging at a rate of 10 frames per second. The processor may sample each consecutive image (image sampling represented by a full line arrow) namely, one image every 100 ms, and may sample the PIR signal once every 90 msec (PIR sampling represented by a dotted line arrow). In other embodiments other sampling schedules may be used.

The PIR signal can include the output voltage of the PIR sensor at a specific moment, e.g., at the moment of sampling, or the PIR signal can include a plurality of PIR sensor output voltages (as schematically demonstrated in FIG. 3), typically the signal being a result of a function (e.g., an average or mode) of a plurality of PIR sensor outputs generated prior to the moment of sampling, e.g., the PIR outputs generated in the past 90 ms.

Typically, the image sensor frame rate is much lower than the PIR sensor output rate. Thus, there are typically many PIR sensor outputs in a time window between two sampled images. In one embodiment the PIR signal includes PIR sensor outputs generated within the time window between two sampled images. The PIR outputs can be combined and a PIR signal may be calculated using an appropriate function, to create a PIR signal representative of the conditions in the field of view of the PIR sensor during the time window.

Between sampling the processor may run computer vision algorithms to analyze image data gathered from the sampled image (and possibly compare or otherwise combine the sampled image with previously sampled images). Additional processes may be run by the processor to determine occupancy based on the image analysis and based on the PIR signal and/or determine occupancy based on the image analysis alone.

In one embodiment the method includes detecting the occupant and tracking the detected occupant throughout images of the space. If at some point the occupant stops moving the tracking information can be used to facilitate detection of the occupant even when the occupant is sedentary.

Figure 4:
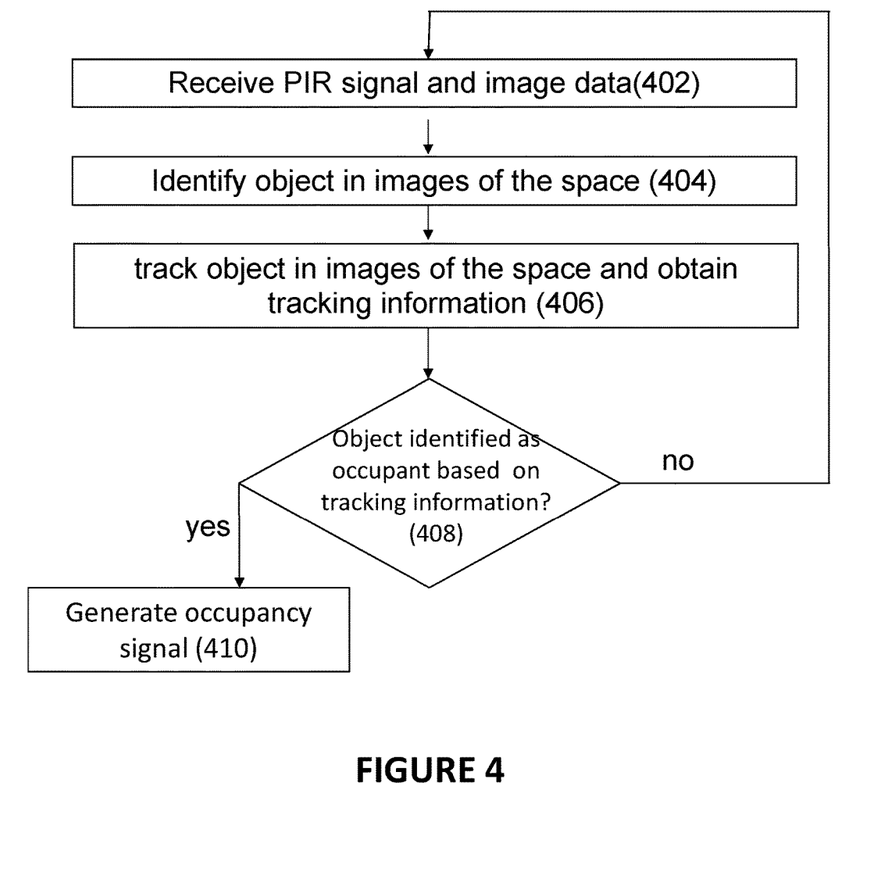
FIG. 4 is a schematic illustration of a method for detecting occupancy based on tracking an object throughout images of the space, according to an embodiment of the invention.

According to one embodiment a method for detecting occupancy includes tracking an object throughout images of the space to identify the object as an occupant, as schematically illustrated in FIG. 4.

In one embodiment a processor such as processor 102 receives a PIR signal and image data (402). Based on the PIR signal and image data an object is identified in images of the space (404). The identified object is then tracked in subsequent images of the space and tracking information is obtained (406). Information from the tracking of the object may then be used to determine if the object is an occupant.

In one embodiment tracking information such as direction of movement and speed of movement can be used in determining if an object is an occupant. For example, speed of movement of the object above a predetermined threshold or movement in a predetermined direction may indicate the object is an occupant. In another embodiment tracking information such as location of the object, can be used in determining if the object is an occupant. If the object is identified as an occupant based on the tracking information (408) and based on image analysis, a signal of occupancy is generated (410).

In one embodiment, detecting an occupant in a space includes detecting the occupant based on a PIR signal and image analysis including a location of the occupant within the space.

Figure 5:
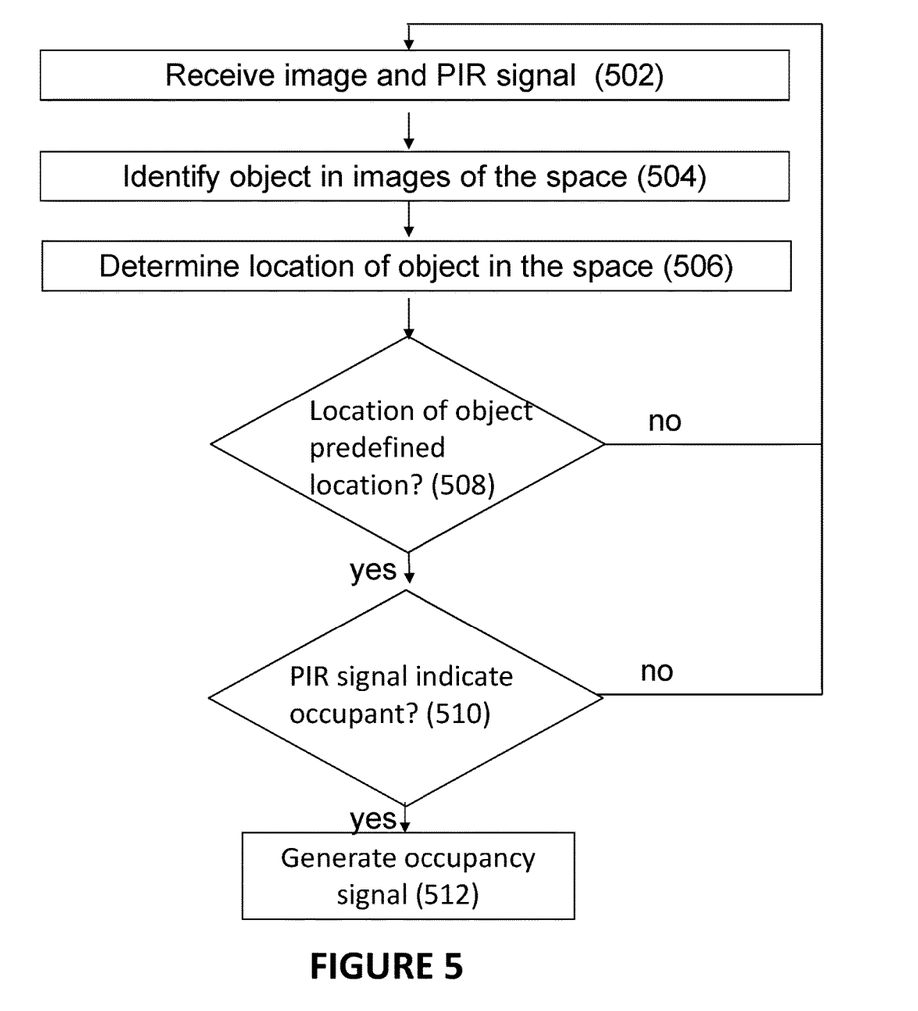
FIG. 5 is a schematic illustration of a method for detecting occupancy based on determining a location of an object within the space, according to an embodiment of the invention.

In one embodiment, which is schematically illustrated in FIG. 5, a method for detecting occupancy includes determining a location of an object within the space.

In one embodiment if an object is detected at a predefined location in the space (e.g., detected at the location based on image analysis) and based on a PIR signal, occupancy can be determined. For example, the predefined location may be an entrance to the space (e.g., doorway), which could be at the perimeter of the image. Thus, according to one embodiment, if an object is located at an entrance to the space and/or at the perimeter of an image or several images, and based on a PIR signal, it may be determined that the object is an occupant. In some embodiments if an object is not detected at the predefined location then even if the PIR signal indicates the presence of an occupant, the occupancy determination may be that there is no occupant present in the space.

Thus, a processor may receive an image of a space and a signal from a PIR sensor monitoring the space (502) and detect an object based on analysis of the image (504). The location of the object within the space is then determined (506). The method further includes determining if the object is an occupant based on the signal from the PIR sensor and on the location of the object in the image. For example, if the location is a predefined location (508) and based on a PIR signal (510) the object is identified as an occupant. If the object is identified as an occupant (512) an occupancy signal can be generated (514). In some embodiments a device (e.g., an environment comfort device) may be controlled based on the occupancy signal Identifying the object as an occupant may include calculating a probability of the object being an occupant, e.g., as discussed above.

According to one embodiment determining the location of the object in the space includes detecting movement at the location, for example, detecting movement based on image data. According to another embodiment the method includes applying a shape detection algorithm on the image and determining if the object is an occupant based on a shape of the object in the image. Thus, determining the location of the object includes detecting a predetermined shape at the location. In other embodiments the method includes tracking the object in images of the space and determining if the object is an occupant based on the tracking of the object in the images, for example, as described herein.

The location may be a predetermined location, for example, a location in the image known to include the entrance to the space. In some embodiments the location includes the perimeter of the image.

Figure 6:
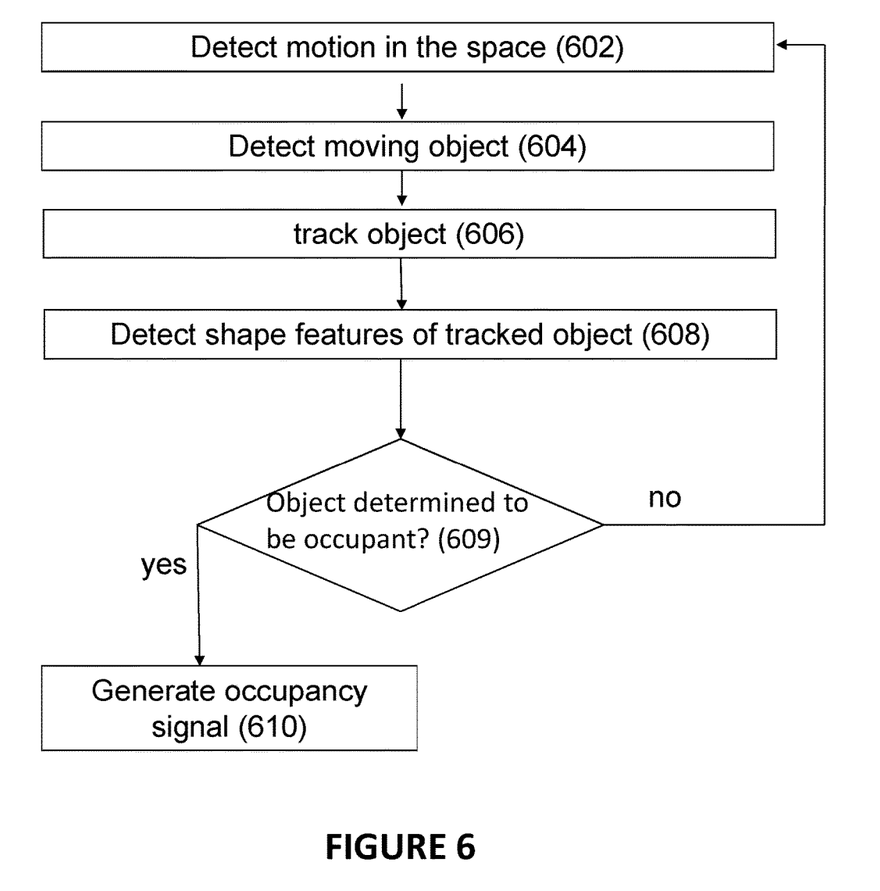
FIG. 6 is a schematic illustration of a method for determining occupancy in a space based on detecting motion in the space.

In one embodiment, which is schematically illustrated in FIG. 6, a method for determining occupancy in a space includes detecting motion in the space (602) (e.g., based on a signal from a PIR sensor). Based on the detection of the motion, detecting a moving object in an image of the space (604) and tracking the object in images of the space (606). The shape (or shape features, e.g., as described above) of the tracked object is detected (608) and it is determined if the object is an occupant based on the detected shape or shape features (609). If the object is determined to be an occupant a signal of occupancy is generated (610). If the object is not determined to be an occupant then the system searches for motion again.

In one embodiment the method includes determining a number of occupants in the space based on identifying the object as an occupant. In one embodiment an object is detected based on a PIR signal and based on image analysis. Once the object is identified as an occupant a counter may be changed to raise the number of occupants in the space by one. For example, an occupancy signal can be sent to a processor to change the counter.

As long as the object is tracked no other signal is sent to the counter. When the object is no longer detected and can no longer be tracked the counter is changed to reduce the number of occupants in the space by one.

In one embodiment the PIR output is digital. The number of occupants can be determined based on the level of the digital PIR output. Typically, the level of the PIR signal is directly proportional to the number of occupants in the space. A PIR sensor may be calibrated such that the relation between a number of occupants and level of PIR output is known.

The location of an occupant relative to the PIR sensor may affect the PIR output. Thus, in some embodiments the number of occupants is determined based on the location of the occupants (e.g., as determined based on image analysis) and based on the level of the PIR output.

Figure 7:
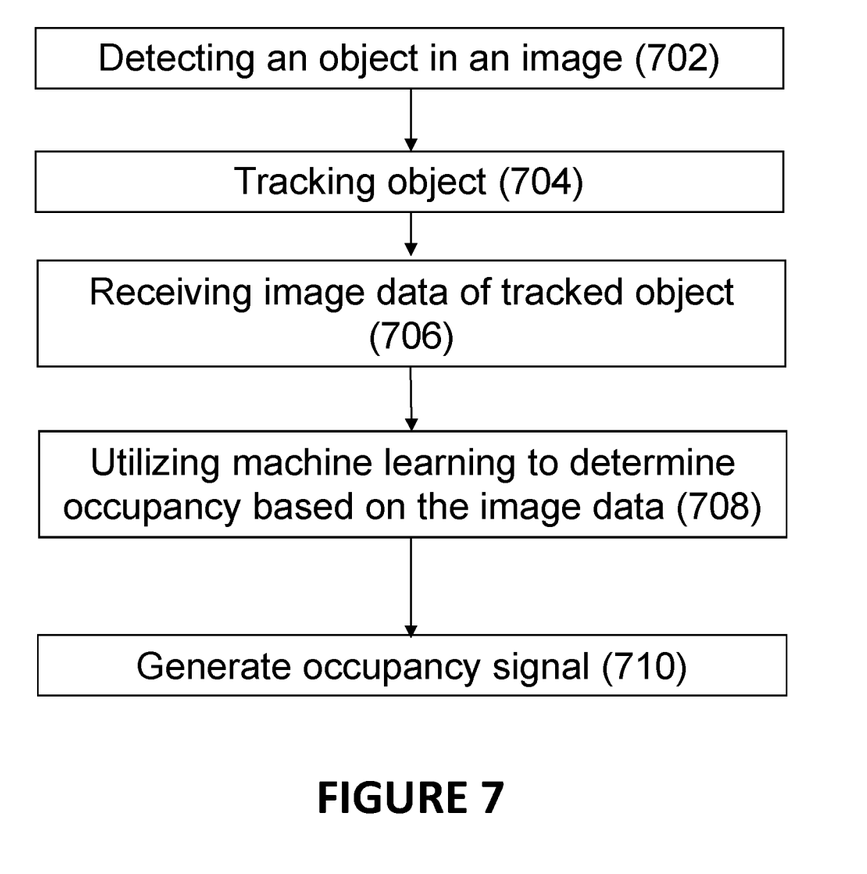
FIG. 7 is a schematic illustration of a method for determining occupancy utilizing a machine learning process, according to embodiments of the invention.

In one embodiment, which is schematically illustrated in FIG. 7, an object is detected in an image of the space (702) and the object is tracked (704). Images of the tracked object are received by a processor (706) and are used by the processor in a machine learning process to identify the tracked object as an occupant (708). Once the object is identified as an occupant, an occupancy signal can be generated (710).

In one embodiment a number of occupants in the space may be determined based on output from the machine learning process, for example, by signaling to a counter, as described above.

The machine learning process may be a supervised learning process based on images of occupants in spaces as learning examples or an unsupervised learning process carried out by the process on-site. The output of the machine learning process may include identification of shape or other features or image features. Based on identification of the desired features an object may be identified by the processor as an occupant.

In one embodiment the machine learning process may be based on PIR signals as learning examples or on a combination of PIR signals and images. In one example a PIR signal is received at the processor and is stored in a memory device associated with the processor. The processor may then utilize a machine learning process to detect the object based on the PIR signal.

Systems and methods according to embodiments of the invention provide assisting information to enable easier detection and tracking of an occupant, even a sedentary occupant, in a space thereby providing a relatively computationally inexpensive method for determining occupancy in a space.

What is claimed is:

1. A system for detecting occupancy in a space, the system comprising
    a PIR sensor monitoring the space;
    an image sensor for obtaining images of the space; and
    a processor to
        detect a moving object in an image of the space based on a signal from the PIR sensor;
        track the object in images of the space;
        detect a shape of the tracked object using image analysis;
        and control a first function of a device based on analysis of the shape of a first image and a first signal from the PIR sensor, the first PIR signal being assigned a higher weight than the analysis of the first image, and control a second function of the device based on analysis of the shape of a second image and based on a second signal from the PIR sensor, the analysis of the second image being assigned a higher weight than the second PIR signal.

2. The system of claim 1 wherein the device is an environment comfort device.

3. The system of claim 1 wherein the processor is to detect the shape of an occupant in the second image.

4. The system of claim 1 wherein the first function of the device is an ON function and wherein the second function of the device is an OFF function.

5. A method for determining occupancy in a space, the method comprising:
    using a processor to detect motion in the space, based on a signal from a PIR sensor monitoring the space;
    receiving at the processor an image of a space and based on detection of the motion, detecting a moving object in the image;
    tracking the object in images of the space;
    detecting a shape of the tracked object, using image analysis;
    determining if the object is an occupant based on the shape of the tracked object; and
    using the processor to control a first function of a device based on detection of the shape in a first image of the space and based on a first signal from the PIR sensor, the first PIR signal being assigned a higher weight than the detection of shape in the first image, and to control a second function of the device based on detection of the shape in a second image and based on a second signal from the PIR sensor, the detection of shape in the second image being assigned a higher weight than the second PIR signal.

6. The method of claim 5 comprising:
    detecting a location of the object in the image; and
    determining if the object is an occupant based on the detection of motion and on the location of the object in the image.

7. The method of claim 6 wherein the location in the image is a predetermined location.

8. The method of claim 6 wherein the location in the image comprises a perimeter of the image.

9. The method of claim 6 wherein determining if the object is an occupant comprises calculating a probability of the object being an occupant.

10. The method of claim 5 comprising applying a shape detection algorithm on the second image and determining if the object is an occupant based on a shape of the object in the second image.

* * * * *